(12) United States Patent
Aycock

(10) Patent No.: US 7,260,855 B2
(45) Date of Patent: Aug. 28, 2007

(54) PORTABLE INDIVIDUAL COLLAPSIBLE LATRINE

(76) Inventor: Gerald E. Aycock, P.O. Box 8948, Horseshoe Bay, TX (US) 78657

( * ) Notice: Subject to any disclaimer, the term of this patent is extended or adjusted under 35 U.S.C. 154(b) by 110 days.

(21) Appl. No.: 11/334,272

(22) Filed: Jan. 18, 2006

(65) Prior Publication Data

US 2007/0163037 A1      Jul. 19, 2007

(51) Int. Cl.
*A47K 11/06* (2006.01)
(52) U.S. Cl. .......................................... 4/484
(58) Field of Classification Search ............. 4/483–484
See application file for complete search history.

(56) References Cited

U.S. PATENT DOCUMENTS

| | | | |
|---|---|---|---|
| 701,826 A | 6/1902 | Amerman et al. |
| 1,521,740 A | 1/1925 | Wernli et al. |
| 1,690,793 A | 11/1928 | Oppenheim |
| 2,376,036 A | 5/1945 | Cotton |
| 3,063,061 A | 11/1962 | Bertram |
| 3,105,665 A | 10/1963 | Starkweather |
| 3,122,397 A | 2/1964 | Mintz |
| 3,175,227 A | 3/1965 | Lowthers et al. |
| 3,484,875 A | 12/1969 | Eisenberg |
| 3,495,278 A | 2/1970 | Peters |
| 3,602,924 A | 9/1971 | Kneisley |
| 3,950,794 A | 4/1976 | Dalton |
| 4,633,536 A | 1/1987 | Tribble-DuBose |
| 5,876,091 A | 3/1999 | Chemomashentsev |
| 6,009,571 A | 1/2000 | Battiston et al. |
| 6,889,393 B1 | 5/2005 | Rinaldo |
| 2001/0007934 A1 | 7/2001 | Smith |

*Primary Examiner*—Charles E. Phillips
(74) *Attorney, Agent, or Firm*—Egbert Law Offices

(57) ABSTRACT

A portable, individual, collapsible latrine especially suitable for outdoor use including military personnel. The latrine comprises a pair of generally rectangular shaped members, preferably of a molded plastic material, fitting one inside the other and hingedly connected, to form a collapsible frame. A pair of straps connect the upper ends of the two frame members to limit the extent of opening, and to support weight placed on the lid (namely the weight of a user). A lid (also of a molded plastic material) is hingedly connected to one of the frame members, preferably by means of a "living hinge" molded into the material. A disposable bag fits into an opening in the lid, for capturing human waste, with material in the bag to at least partially absorb the waste. A supply of toilet tissue, bags, and absorbent material are carried on the frame by removable cords. Retainer straps are provided on both sides of the latrine, with at least one end removably mounted by a hook-and-loop fastener, for secure yet releasable holding of equipment, for example a weapon.

6 Claims, 3 Drawing Sheets

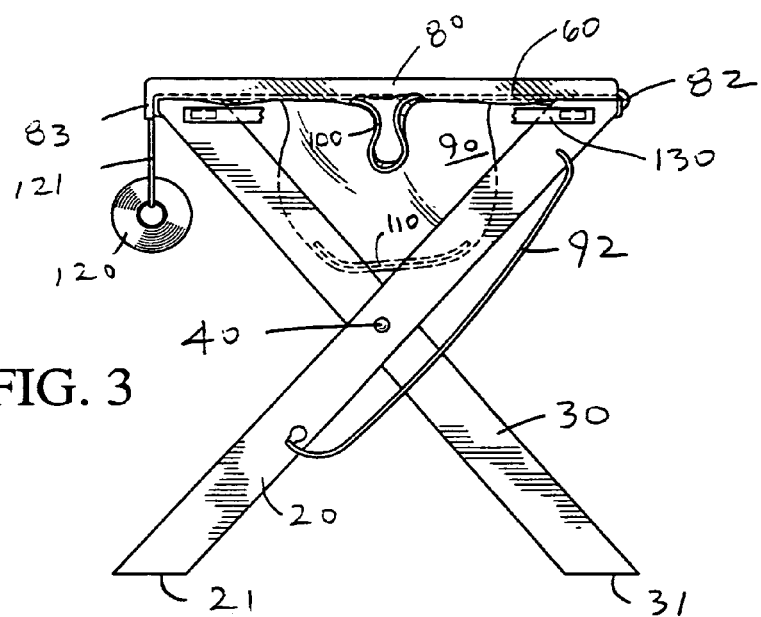
FIG. 3
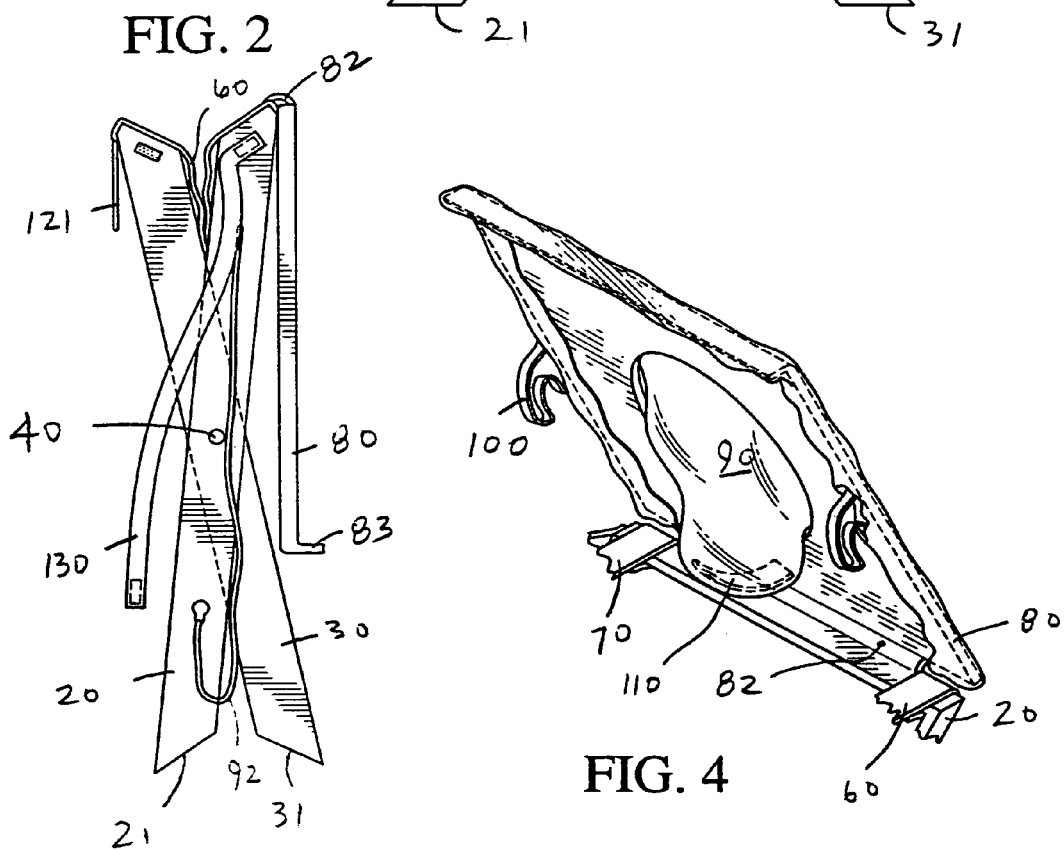
FIG. 2
FIG. 4

PORTABLE INDIVIDUAL COLLAPSIBLE LATRINE

CROSS REFERENCE TO RELATED APPLICATIONS

None.

BACKGROUND—FIELD OF THE INVENTION

This invention relates generally to apparatus for use in personal hygiene matters in a "field" (that is, not in a home or other structure) setting. With more particularity, this invention relates to a novel type of portable latrine, which is collapsible for easy carrying and storage on any civilian or military vehicle by straps or bungee cords, is preferably made from light weight and inexpensive materials, and comprises additional attributes which make it desirable for use by humans, including but not limited to military personnel in the field.

BACKGROUND—RELATED ART

A long standing problem for man has been the provision of facilities in outdoor settings to accommodate normal bodily functions. A number of outdoor toilets or latrines have been developed to address this problem. Such outdoor latrines are used by a variety of user groups: outdoorsmen such as hunters, fishermen, and campers; military personnel; or any other person which has a need to use typical sanitary facilities, but finds him or herself in a remote location where such facilities are unavailable.

Some of the attributes which an outdoor latrine would ideally possess include:

Light weight and small size, both leading to ease of portability, so that the user could carry the latrine from location to location;

Possessing a means for capturing human waste, so that it can be properly disposed of (rather than simply left on the surface of the earth, or requiring that a hole be dug);

Adapted to quick deployment in a variety of outdoor settings, ground conditions, etc.;

Ease of manufacture;

Low cost;

Having the desired attributes in a fully self-contained package.

In addition, for military personnel, there exists a need to keep weapons free of dirt, sand and the like, and readily accessible even while using latrine facilities. Experience suggests that military personnel are in a vulnerable posture while using latrine facilities in the field, and it is absolutely necessary that their weapons remain readily accessible for immediate deployment if necessary.

SUMMARY OF THE INVENTION

The present invention comprises a portable, individual, collapsible latrine (referred to at times by the acronym PICL) especially suitable for outdoor use including military personnel. The latrine comprises a pair of generally rectangular shaped members, preferably of a molded plastic material, fitting one inside the other and hingedly connected, to form a collapsible frame. A pair of straps connect the upper ends of the two frame members to limit the extent of opening and to support weight on the lid itself. A lid (also of a molded plastic material) is hingedly connected to one of the frame members, preferably by means of a "living hinge" molded into the material. A disposable bag fits into an opening in the lid, for capturing human waste, with material in the bag to at least partially absorb the waste. A supply of toilet tissue, bags, and absorbent material are carried on the frame by removable cords. Retainer straps are provided on both sides of the latrine, with at least one end removably mounted by a hook-and-loop fastener, for secure yet releasable holding of equipment, for example a weapon.

BRIEF DESCRIPTION OF THE DRAWINGS

FIG. 2 is a side view of the invention, in a collapsed position.

FIG. 3 is a side view of the invention, in a position ready for use.

FIG. 4 shows further detail of the lid and disposable bag.

DESCRIPTION OF THE PRESENTLY PREFERRED EMBODIMENT(S)

While various embodiments of the present invention, with reference to the drawings one of the presently preferred embodiments will now be described. It is understood that various changes may become apparent to those having ordinary skill in the relevant art field, but that do not depart from the spirit and scope of the invention.

Figure 1:
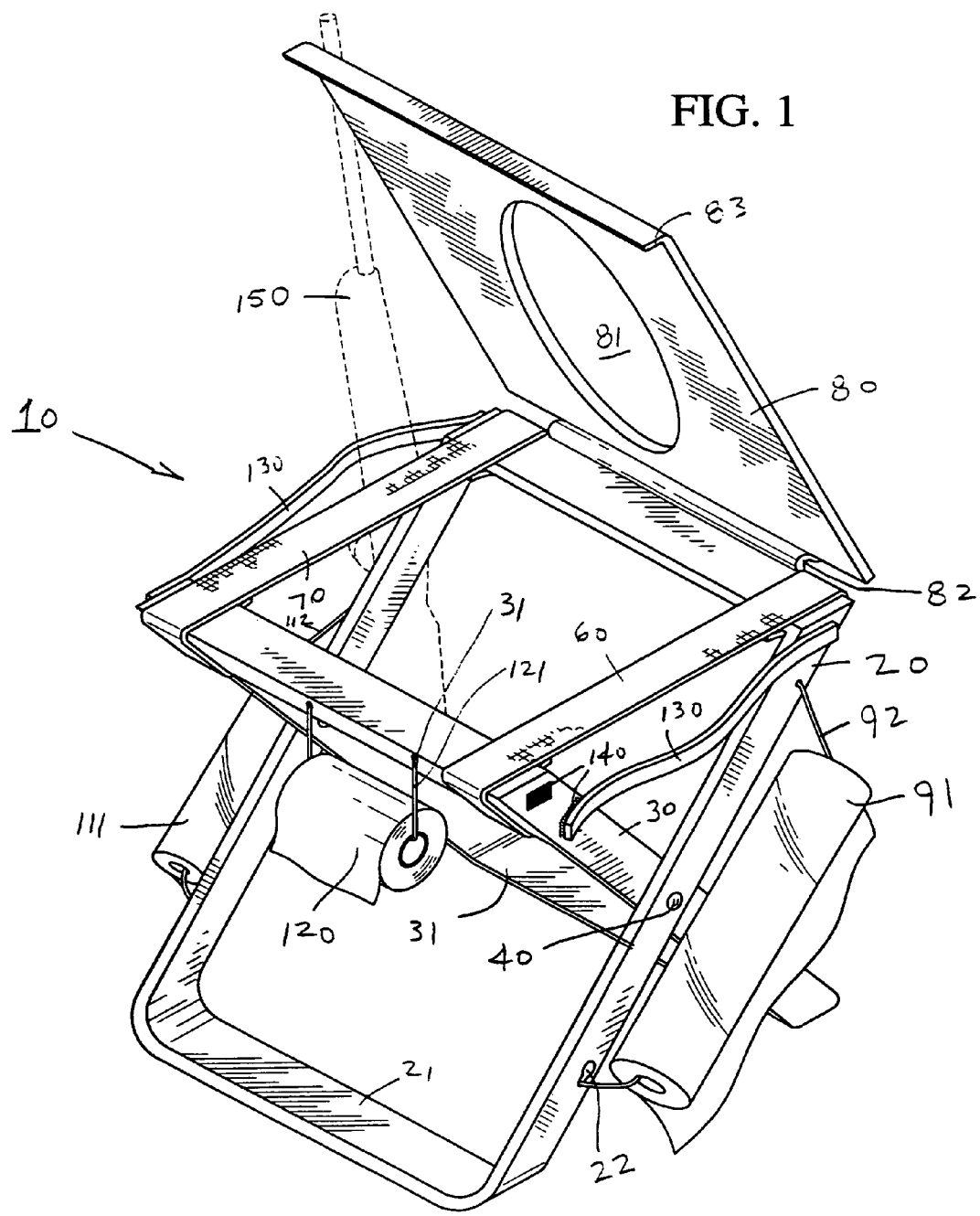
FIG. 1 is a perspective view of the portable individual collapsible latrine of the present invention, in a position in preparation for use, with the lid raised to show certain detail.

With reference to the drawings: FIG. 1 shows an overall perspective view of the latrine 10. A pair of generally rectangular frame members 20 and 30 are hinged together by pins 40. It is understood that other similar means, such as screws or the like, could be used. The dimensions of the two frame members are such that one fits inside the other (with respect to widths), so that frame members 20 and 30 are connected scissors-like and may be folded together and collapsed when desired, as easily seen in FIG. 2. The dimensions of frame members 20 and 30 are such as to place lid 80 (described in more detail below) at a convenient height above the ground, and to provide sufficient strength to support a person. In particular, foot portions 21 and 31 are relatively wide, for example on the order of 3", in order to provide sufficient surface area to prevent the latrine from sinking into soft ground when a person is seated thereon. For ease in manufacture, this width dimension can simply be maintained for the entirety of the frame member. While frame members 20 and 30 could be made from a variety of materials, a presently preferred embodiment utilizes a plastic material, readily amenable to manufacture by injection molding or other similar means.

A pair of support straps 60 and 70 join the upper ends of frame members 20 and 30, and being of fixed length, limit the extent of opening of the frame members, and support weight placed on the lid (namely, the weight of a user of the latrine). This can be clearly seen in FIGS. 1 and 3. Preferably, straps 60 and 70 are made of a woven material, for example woven nylon or similar fibers, to be very flexible and readily collapse as see in FIG. 2, yet be very strong.

Lid 80 is hingedly connected to one of the frame members, for example frame member 20 as shown. Lid 80 has dimensions suitable for comfortably accommodating a human when seated thereon, and comprises an opening 81. In the presently preferred embodiment, lid 80 is formed of a material similar to that of the frame members, for example a plastic material, which lends itself to injection molding. Preferably, lid 80 is hingedly connected to frame member 20 by hinge 82, which is preferably what is known as a "living hinge," which is simply a connecting strip or band of plastic material, of dimensions suitable to permit flexing and thereby serve as a hinge. A living hinge has several advantages in this application. It is quite durable; is formed in the molding process, which permits the molding of lid 80 and frame member 20 in one piece, and is therefore inexpensive; and avoids the costs typically associated with more conventional hinges which use two mating pieces through which a pin is inserted. As can be seen in the drawings, lid 80 is sized with regard to width so as to cover the frame members and support straps, and front to back dimensions to span the width of the separation of the top of the frame members. Preferably, lid 80 comprises a lip 83 at its front end, which provides a rounded, comfortable surface for the user to contact, and further provides a means for retaining bag 90 in place, further described below.

The invention comprises a bag 90 into which waste material falls. Bag 90 is of an inexpensive and disposable material, for example a plastic, preferably of a biodegradable nature. The dimensions of bag 90 are such that it fits over the entirety of the upper surface of lid 80, and around the edges thereof, and bag 90 further comprises a pair of drawstrings 100 running through a pocket around the circumference of the open mouth of bag 90, so that after placing bag 90 over and around lid 80, drawstrings 100 can be snugged up to hold bag 90 in place. The two drawstrings preferably have knots or other tactile portions, so that the user can easily find and manipulate the drawstrings by feel alone, in total darkness and potentially hostile environments. Two drawstrings are preferred, as the weight of bag 90 alone is not sufficient to draw the mouth of the bag closed. Bag 90 forms a pocket which extends down through opening 81, to provide a volume to hold waste material. As can be readily seen from the drawings, especially FIGS. 3 and 4, front lip 83 of lid 80 also helps hold bag 90 in place, and further lid 80 (when in place as shown in FIG. 3) traps the edges of bag 90 between the lower surface of lid 80, frame members 20 and 30, and support straps 60 and 70. All of these means serve to hold bag 90 securely in place. A quantity of bags 90 may be formed into a roll 91, and held onto latrine 10 by a cord 92 fixed to frame member 20. One end of cord 92 has a knot or other enlargement, which can be removably fixed into a keyhole 22, as can be easily understood, so that roll 91 can be removed or replaced. This arrangement ensures that a supply of bags is always present with the latrine.

Preferably, a quantity of absorbent material 110 is placed in bag 90 before use. Absorbent material 110 may comprise a number of materials known in the art, such as natural and synthetic fibrous materials, paper, fabric, etc. Padding in the nature of that used in modern disposable diapers is a possible and acceptable material. As with bags 90, absorbent material 110 is advantageously placed into a roll 111 and held onto latrine 10 by a cord 112 fixed to frame member 20. One end of cord 112 has a knot or other enlargement, which can be removably fixed into a keyhole 23 (not visible in the drawings), as can be easily understood, so that roll 111 can be removed or replaced. This arrangement ensures that a supply of absorbent material is always present with the latrine.

A roll of toilet tissue 120 is preferably mounted on the front edge of frame member 30 by a cord 121 fixed to said front edge. As with the other cords, one end of cord 121 has a knot or other enlargement, which can be removably fixed into a keyhole 31, as can be easily understood, so that roll 120 can be removed or replaced. This arrangement ensures that a supply of toilet tissue is always present with the latrine.

As previously described, for military personnel it is important that their weapon be always ready at hand for use. The latrine of the present invention provides a means for doing so. A strap 130 is fixed to at least one, and preferably both, sides of latrine 10. As can be seen in the drawings, especially FIGS. 1 and 2, strap 130 spans the distance between the upper ends of frame members 20 and 30 when open, then either folds up or can be disconnected when frame members 20 and 30 are folded together, as in FIG. 2. Preferably, at least one end of strap 130 is removably fixed to the frame members, for example by a hook-and-loop fastener 140 (for example, a Velcro® fastener), so that it is securely held in place yet quickly removable. As can be seen in FIG. 1, this arrangement permits a weapon, for example rifle 150 (shown in phantom lines) to be held in a ready upright position while the latrine is in use. Strap 130 on the other side can be used for a weapon, tools, etc.

Figure 5:
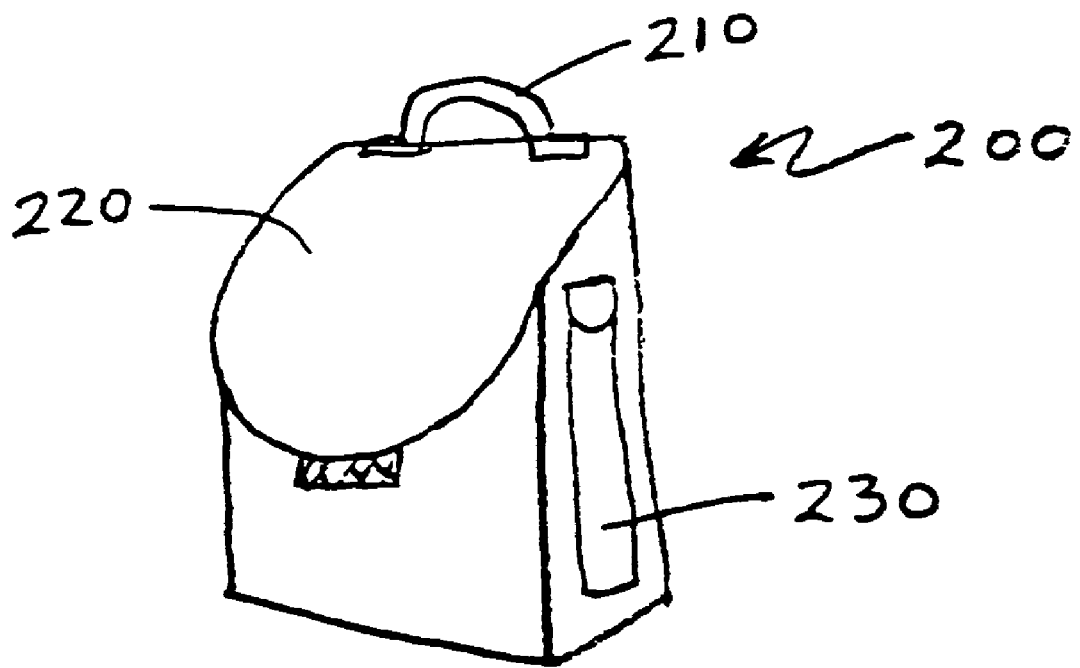
FIG. 5 shows a carrying bag, particularly adapted to hold the portable individual collapsible latrine and accessories.

Another attribute of the invention is shown in FIG. 5. FIG. 5 shows a storage bag 200 especially sized and shaped to accommodate latrine 10 in a folded-up position. A handle 210 provides a means for attaching storage bag 200 (containing latrine 10) to vehicles and the like. It can be readily appreciated that storage bag 200 protects latrine 10 from rough treatment, as is commonly experienced with military equipment. A top flap 220 is secured with a releasable fastener, for example a hook-and-loop fastener, and one or more pockets 230 can be used to store extra bags, toilet tissue, or other desired accessories. Storage bag 200 can be made of any strong fabric, such as canvas.

While the preceding description contains many specificities, same are disclosed in order to disclose some of the presently preferred embodiments, and not by way of limitation. Various changes are possible without departing from the spirit and scope of the invention, including but not limited to different sizes and shapes of the various structural members, to accommodate different users; different materials for the various elements of the latrine; the addition of accessories such as a shoulder strap for carrying, fastening to vehicles, etc.

Therefore, the scope of the invention is not to be limited to the preferred embodiments set forth above, but by the scope of the appended claims and their legal equivalents.

I claim:
1. A portable, collapsible, individual latrine, comprising:
 a) a pair of rectangular frame members, each having upper ends and foot portions, said pair of rectangular frame members dimensioned so that one fits within the other, and said frame members being hingedly connected in scissors fashion so as to be openable to form a support, wherein said foot portions present a generally horizontal weight bearing portion to a supporting surface;
 b) a pair of support straps joining said upper ends of said rectangular frame members;
 c) a lid, having an opening therein, hingedly connected to one of said rectangular frame members;
 d) a bag for catching and containment of human waste, said bag comprising a pair of drawstrings around an open mouth of said bag, said bag dimensioned so as to cover said lid and fit down inside said opening; and
 e) a strap fixed to one side of said latrine on said frame members and spanning the open upper end of said latrine, at least one end of said strap removable connected to said frame members, said strap positioned and dimensioned to support a weapon in a ready upright position while said latrine is in use.

2. The latrine of claim 1, further comprising:

f) a second strap fixed to a second side of said latrine on said frame members and spanning the open upper end of said latrine, at least one end of said strap removable connected to said frame members;

g) a first cord fixed to one of said frame members on a side of said latrine, at least one end of said first cord comprising a knot and fitting removably within a keyhole in said frame member, and a roll of said bags held on said first cord.

3. The latrine of claim 2, further comprising:

h) a quantity of an absorbent material within said bag;

i) a second cord fixed to one of said frame members on another side of said latrine, at least one end of said second cord comprising a knot and fitting removably within a keyhole in said frame member, and wherein said absorbent material is formed into a roll and held on said second cord; and j) a third cord fixed to one of said frame members at a front edge of said frame member, at least one end of said third cord comprising a knot and fitting removably within a keyhole in said frame member, and wherein a roll of toilet tissue is held on said third cord.

4. The latrine of claim 1, wherein said frame members and said lid are formed of a plastic material, and said lid is integral to one of said frame members and connected thereto by a connecting strip of said plastic material.

5. The latrine of claim 3, wherein said frame members and said lid are formed of a plastic material, and said lid is integral to one of said frame members and connected thereto by a connecting strip of said plastic material.

6. The latrine of claim 1, further comprising a storage bag having a handle thereon and a top flap secured by a hook-and-loop fastener, and one or more side pockets, said storage bag sized and shaped to accommodate said latrine within, when said latrine is in a folded-up position.

* * * * *